Feb. 15, 1927.

C. A. WIDMER 1,618,031

HIDE MATERIAL AND PROCESS OF OBTAINING SAME

Filed Nov. 30, 1923

INVENTOR
Charles A. Widmer
BY
ATTORNEY

Patented Feb. 15, 1927.

UNITED STATES PATENT OFFICE.

1,618,031

CHARLES A. WIDMER, OF GLEN ROCK, NEW JERSEY.

HIDE MATERIAL AND PROCESS OF OBTAINING SAME.

Application filed November 30, 1923. Serial No. 677,751.

The invention relates to a process of pickling green hide and to the novel product obtained thereby. Ordinary raw hide swells or plumps when exposed to moisture or oil and the like and shrinks again on drying out. It is the object of the present invention to so treat the green hide that the same is formed into a homogeneous mass thru breaking down of the cells that it will not absorb moisture from the atmosphere nor oil when running in same, and is of such a nature, furthermore, that it may be readily machined, for example, in the production therefrom of silently running gear wheels. It may thus serve as a substitute for vulcanized fibre which is not especially suitable, being too brittle; also as a substitute for bakelite which, aside from its cost, is hard on the cutting tools and results also in ragged edges when machined. The novel product, on the contrary, as homogeneous, hard, tough and of a resilient nature, requiring, furthermore, no coating of shellac or paraffin to protect it against moisture and oil. It will, also, not shrink, so that it may be used, as aforesaid, for the production of gears and be suitable for many other uses which will readily suggest themselves.

The nature of the invention, however, will best be understood when described in connection with the accompanying drawings, in which—

Similar characters of reference designate corresponding parts thruout the several views.

Figure 1:
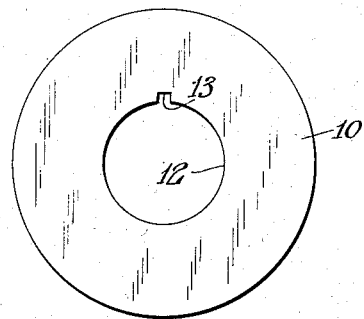
Fig. 1 is a plan of a gear blank composed of the novel product.
Figure 2:
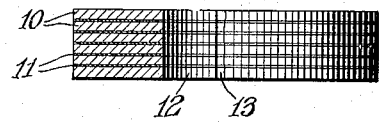
Fig. 2 is a partial vertical section therethru.

Referring to the drawings, the novel product is illustrated as embodied in a gear blank; and for this purpose it is preferably composed of a plurality of disks 10 of green hide treated in manner hereinafter set forth, intermediate layers of adhesive 11 being provided and the whole mass subjected to extremely high pressure, for example up to 100 tons per square inch—the novel hide product withstanding such pressures. In this manner, a blank of any desired thickness may be built up and of a diameter within the capacity of the hide. An arbor opening 12, as well as a keyway 13 is provided therein and may be shrouded if necessary; and the blank is made circular for the purpose of having teeth cut thereon. It will be understood, of course, that the material may be provided in various shapes and sizes and of one or more thickness of hide. Moreover, by boiling the material in water, it may be temporarily sufficiently softened to be moulded into various shapes under suitable pressure, and then subsequently dried. As a gear wheel, the same will be especially efficient in providing silent running by introducing same between two gears, as is well understood. It will, moreover, tend to polish the teeth of a meshing metal gear rather than wear same and thus prolong the life thereof.

In order to render the green hide impervious to moisture and oil and to reduce the same to a homogeneous hard, tough substance, which while dense is not brittle though resilient, and in which the cells thereof are broken down, I proceed as follows:—

Ordinary green and untanned hide directly as obtained from the carcass is depilated and unfleshed and the lime then removed in the ordinary manner. The hides are thereupon placed in vats containing an aqueous solution of bichromate of potash and alum, either powdered or lump, in the proportions of 5 lbs. each of potassium bichromate and alum to approximately 40 gals. of water. The foregoing proportions of bichromate of potash and alum may be varied from the equal parts noted to 75% of the former and 25% of the latter and 25% of the former and 75% of the latter. Where the bichromate of potash predominates, the hide product will have a color bordering on black; whereas, with the reduced amount of bichromate of potash the hide product will have an amber color; and intermediate shades may be obtained by varying the proportions between the aforesaid limits. It is to be understood, also, that the efficiency of the product is not thereby impaired. The hides are pickled in this solution for approximately 24 hours, then removed and stretched on a frame and dried in a suitable drying room for approximately 24 hours and at a temperature approximating 80° F. The product is then ready for the market; and, if desired, may be built up or moulded as hereinbefore set forth.

A novel product which is dense and non-pliable but resilient is thus obtained, its hard, tough cells being broken down and closed up, experience having shown that, for example, a one-half to three-quarter inch portion of green hide at neck will yield a strip of approximately three-sixteenths inch thickness. The resulting hide product is suitable for use as gear blanks, mallet heads and wherever a tough and hard material is desired. As aforesaid, it is capable of being readily worked by a machine tool and will take a high polish.

I claim:—

1. The process of pickling green hide, which consists in soaking the depilated and unfleshed hide in an aqueous solution of potassium bichromate and alum only, and removing, stretching and drying same.

2. The process of pickling green hide, which consists in soaking the depilated and unfleshed hide for 24 hours in an aqueous solution of potassium bichromate and alum only, and removing, stretching and drying same.

3. The process of pickling green hide, which consists in soaking the depilated and unfleshed hide in an aqueous solution of bichromate of potash varying from 75% to 25% and of alum varying from 25% to 75%.

4. The process of pickling green hide, which consists in soaking the depilated and unfleshed hide in a solution of 5 lbs. of bichromate of potash and 5 lbs. of alum in approximately 40 gals. of water.

5. A gear blank comprising a circular piece of nonabsorbent hide material readily machined.

6. A gear blank comprising a circular piece of hide material which is dense, resilient and non-absorbent and readily machined.

7. A gear blank composed of a plurality of layers of untanned hide previously treated solely with potassium bichromate and alum, and of intermediate layers of adhesive.

Signed at New York in the county of New York and State of New York this 23rd day of November A. D. 1923.

CHARLES A. WIDMER.